United States Patent
Sun et al.

(10) Patent No.: US 11,688,100 B1
(45) Date of Patent: Jun. 27, 2023

(54) SYSTEMS AND METHODS FOR MULTI-SENSOR IMAGE ENHANCEMENT

(71) Applicant: Apple Inc., Cupertino, CA (US)

(72) Inventors: Libin Sun, Redwood City, CA (US); Feng Li, Fremont, CA (US); Jianping Zhou, Fremont, CA (US); Xiaoxing Li, San Jose, CA (US); Jia Xue, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 181 days.

(21) Appl. No.: 17/351,869

(22) Filed: Jun. 18, 2021

Related U.S. Application Data

(60) Provisional application No. 63/041,482, filed on Jun. 19, 2020.

(51) Int. Cl.
| | |
|---|---|
| *G06T 7/80* | (2017.01) |
| *G06T 9/00* | (2006.01) |
| *G06N 3/04* | (2023.01) |
| *H04N 23/62* | (2023.01) |

(52) U.S. Cl.
CPC ............... *G06T 7/80* (2017.01); *G06N 3/04* (2013.01); *G06T 9/002* (2013.01); *H04N 23/62* (2023.01)

(58) Field of Classification Search
CPC ........... H04N 23/62; G06T 7/80; G06T 9/002; G06N 3/04
USPC ............................................. 382/156
See application file for complete search history.

(56) References Cited

U.S. PATENT DOCUMENTS

2019/0045168 A1* 2/2019 Chaudhuri ............... G06T 3/20
2020/0326773 A1* 10/2020 Bigioi ................... H04N 23/61

OTHER PUBLICATIONS

Zhang, et al., "Self-Attention Generative Adversarial Networks," arXiv:1805.08318v2, Jun. 14, 2019.

* cited by examiner

*Primary Examiner* — Allen C Wong
(74) *Attorney, Agent, or Firm* — Blank Rome LLP

(57) ABSTRACT

Devices, methods, and non-transitory program storage devices are disclosed to provide enhanced images in multi-camera systems, e.g., by using information from images captured by cameras with different properties in terms of optics and/or sensors. In one embodiment, the techniques comprise: obtaining a first image from a first image capture device, wherein the first image has a first field of view (FOV) and a first set of quality characteristics; obtaining a second image from a second image capture device, wherein the second image has a second FOV and a second set of quality characteristics, and wherein the second FOV partially overlaps the first FOV; obtaining a neural network that produces a modified second image having a modified second set of quality characteristics determined by the neural network attempting to match the first set of quality characteristics; and generating an output image based, at least in part, on the modified second image.

20 Claims, 7 Drawing Sheets

SYSTEMS AND METHODS FOR MULTI-SENSOR IMAGE ENHANCEMENT

TECHNICAL FIELD

This disclosure relates generally to the field of digital image processing. More particularly, but not by way of limitation, it relates to techniques for achieving a high quality seamless appearance in enhanced images formed from images captured using two or more different image capture devices.

BACKGROUND

The advent of mobile, multifunction devices, such as smartphones and tablet devices, has resulted in a desire for small form factor cameras capable of generating high levels of image quality in near-real time for integration into such mobile, multifunction devices. Increasingly, as users rely on these multifunction devices as their primary cameras for day-to-day use, users demand features and image quality levels that they have become accustomed to from the use of dedicated-purpose camera devices.

Some camera devices may comprise two or more image capture devices, e.g., in order to produce images having increased quality, field of view (FOV), depth information, etc., i.e., over what a camera device having a single image capture device may be able to produce. For example, stereo image capture systems may consist of two or more image capture devices pointed at the same scene, but that capture the scene from different viewpoints or with cameras that have different properties. In such a system, each image capture device may be chosen to have specific intrinsic properties, e.g., focal length, resolution, color sensitivity, etc., as well as specific extrinsic properties, such as orientation and position. In particular, by choosing complimentary intrinsic and extrinsic properties for the multiple image capture devices in a given image capture system, it may be possible to produce images of increased quality by intelligently combining the information captured by each image capture device.

In some such stereo image capture systems, the information from the various images captured by the two or more image capture devices may be combined, e.g., via a process known as "image stitching" or "image fusion." By stitching together the images captured by the different image capture devices in a multi-camera image capture system, enhanced images may be generated that inherit the individual strengths of the various image capture devices in the image capture system, e.g., certain image capture devices may have a larger field of view (FOV), while other image capture devices may have better imaging quality at certain portions of the captured scene, etc. Stereo image stitching has applications in many areas, including image/video composition and video stabilization, which can utilize the increased FOV that is achievable from performing stereo image stitching. As used herein, stitching may refer to a process that extends the FOV of one or more of the individual source images or a process that generates an enhanced image with the same FOV as one or more of the source images.

However, the image stitching process can be quite challenging, particularly due to the phenomenon of parallax, i.e., the apparent change in position of an object when viewed from different camera viewpoints. E.g., objects closer to the image capture system exhibit more parallax (i.e., greater displacement relative to the position of the object as viewed from the other viewpoint) than those objects that are farther away from the image capture system. Because of this property, parallax may be used as a proxy for depth estimates of objects in the scene, but parallax also causes other issues with image stitching, such as occlusion. Occlusion occurs where an object is visible from the viewpoint of one camera in the image capture system, but is not visible (e.g., due to being blocked by some other object) from the viewpoint of another camera in the image capture system. In cases of occlusion, for a given pixel from an image captured from a first viewpoint, there may be no "corresponding" pixel in an image taken from another viewpoint, and, thus, no other pixel's information with which to combine or enhance the given pixel's information.

Additionally, as mentioned above, different cameras within an image capture system can have different intrinsic properties, e.g., different fields of view, depth of field, spatial resolution, color sensitivity, and/or image signal processor (ISP) tuning, which can further complicate the process of stitching together images from such disparate cameras without the appearance of noticeable artifacts or seams caused by the cameras' differing properties.

Thus, it would be beneficial to have methods and systems that bridge the gap in the perceptual quality of the input images, e.g., in terms of matching spatial resolution, sharpness, texture details, and noise patterns, and achieve high quality seamless appearance in enhanced images formed from input images captured using two or more different image capture devices.

SUMMARY

Devices, methods, and non-transitory program storage devices are disclosed to provide enhanced images in multi-camera systems, e.g., by using information from images captured by cameras with different properties in terms of optics and/or sensors. In particular, the various devices, methods, and non-transitory program storage devices disclosed herein may be able to synthesize appropriate texture details and/or reduce noise in the lower quality image(s) (e.g., a wider FOV image) being used in an image enhancement operation to attempt to match the texture detail and/or noise levels of the higher quality image(s) (e.g., a narrower FOV image) used in the image enhancement operation, e.g., through a dedicated deep neural network (DNN), which produces an artifact-free, high quality, and high resolution output image through a novel image enhancement and post-processing image pipeline.

In one embodiment, the techniques comprise: obtaining a first image from a first image capture device, wherein the first image has a first field of view (FOV) and a first set of quality characteristics (e.g., a set of one or more image quality characteristics, such as texture level, noise level, detail level, saturation level, etc.); obtaining a second image from a second image capture device, wherein the second image has a second FOV and a second set of quality characteristics, and wherein the second FOV partially overlaps the first FOV; obtaining a neural network that produces a modified second image having a modified second set of quality characteristics determined by the neural network to attempt to match the first set of quality characteristics; and generating an output image based, at least in part, on the modified second image, e.g., wherein the output image has the second FOV and quality characteristics modified to attempt to match the first set of quality characteristics. In some cases, the output image may further be generated by fusing at least a portion of the modified second image with at least a portion of the first image, if so desired. According to some embodiments, the first image capture device has a first set of properties (e.g., field of view, spatial frequency, depth of field, magnification, zoom, spectral response range, or resolution), and the second image capture device has a second set of different properties.

According to other embodiments, the first neural network is further configured to extract at least one latent code from the first image. In some such embodiments, the first neural network may be further configured to separate a first plurality of interpretable variables from at least one of the at least one latent codes from the first image, wherein the first plurality of interpretable variables may be modified to independently change semantically-distinguishable characteristics of the modified second image, such as texture density, color balance, noise pattern, or noise level.

In other embodiments, the modified second image may comprise modifications to improve the quality characteristics of both the overlapping portion and the non-overlapping portion of the second FOV.

In other embodiments, the first neural network may be further configured to divide the first image into a first plurality of tiles (e.g., non-overlapping or overlapping tiles, of any desired pixel dimensions) and extract a latent code for each of the first plurality of tiles. In some such embodiments, the first neural network may be further configured to divide the second image into a second plurality of tiles, determine a latent code for each of the second plurality of tiles (e.g., by interpolating between the latent codes extracted for two or more of the first plurality of tiles, such as the n spatially-closest tiles from the first plurality of tiles to an identified best-matching tile position within the first image for a given second tile) and utilize the latent codes determined for each of the second plurality of tiles to produce a modified second image having the modified second set of quality characteristics.

Various non-transitory program storage device embodiments are disclosed herein. Such program storage devices are readable by one or more processors. Instructions may be stored on the program storage devices for causing the one or more processors to perform any of the techniques disclosed herein.

Various programmable electronic devices are also disclosed herein, in accordance with the program storage device embodiments enumerated above. Such electronic devices may include one or more image capture devices, such as optical image sensors/camera units; a display; a user interface; one or more processors; and a memory coupled to the one or more processors. Instructions may be stored in the memory, the instructions causing the one or more processors to execute instructions in accordance with the various techniques disclosed herein.

DETAILED DESCRIPTION

In the following description, for purposes of explanation, numerous specific details are set forth in order to provide a thorough understanding of the inventions disclosed herein. It will be apparent, however, to one skilled in the art that the inventions may be practiced without these specific details. In other instances, structure and devices are shown in block diagram form in order to avoid obscuring the inventions. References to numbers without subscripts or suffixes are understood to reference all instance of subscripts and suffixes corresponding to the referenced number. Moreover, the language used in this disclosure has been principally selected for readability and instructional purposes and may not have been selected to delineate or circumscribe the inventive subject matter, and, thus, resort to the claims may be necessary to determine such inventive subject matter. Reference in the specification to "one embodiment" or to "an embodiment" (or similar) means that a particular feature, structure, or characteristic described in connection with the embodiments is included in at least one embodiment of one of the inventions, and multiple references to "one embodiment" or "an embodiment" should not be understood as necessarily all referring to the same embodiment.

Introduction and Problem Background

Figure 1:
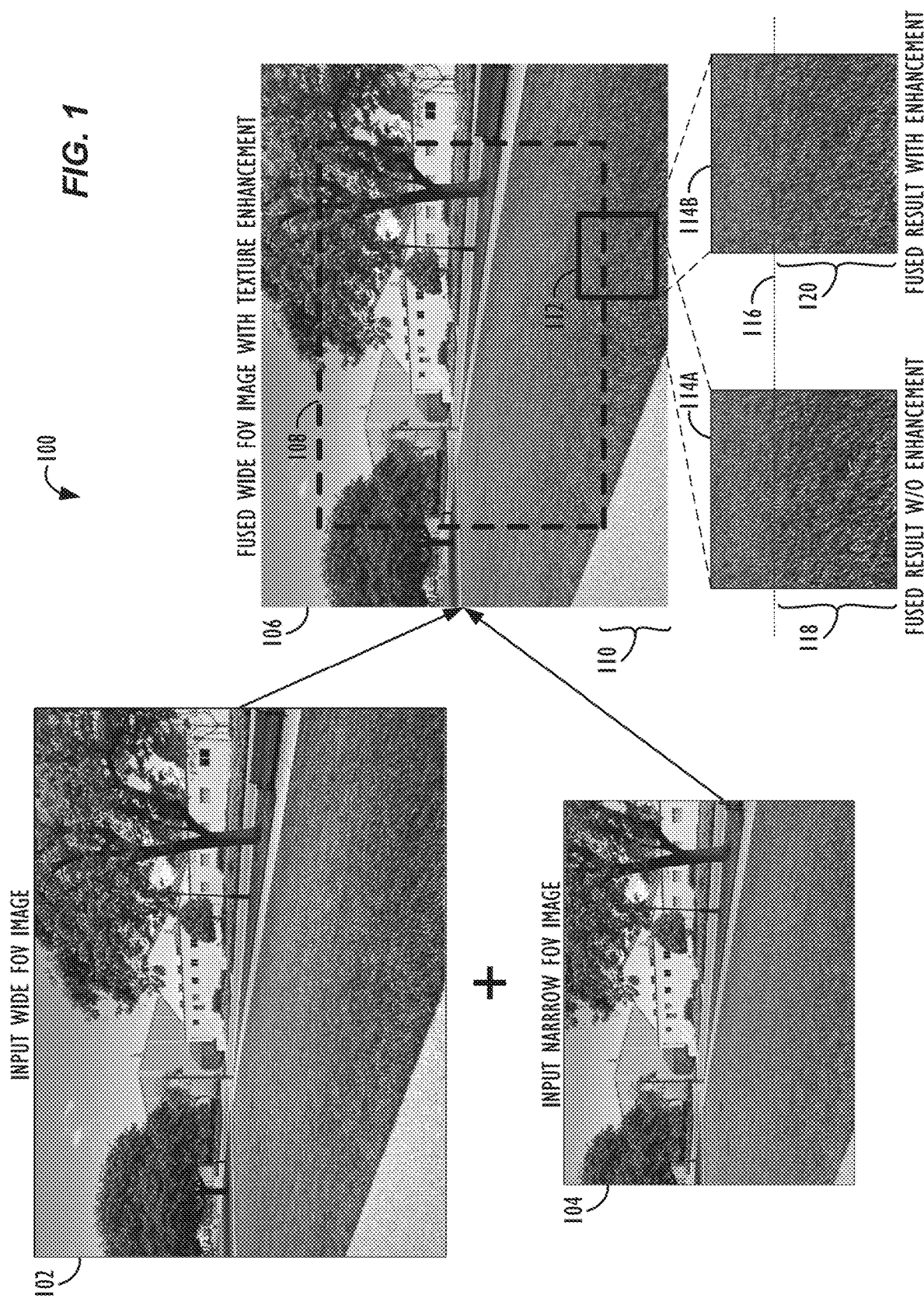
FIG. 1 illustrates exemplary image enhancement operations, according to one or more embodiments.

Turning now to FIG. 1, exemplary image enhancement operations 100 are illustrated, according to one or more embodiments. Image 102 represents an input image from a wider FOV image (which may also be referred to herein as an 'outer' image or 'lower quality' image), and image 104 represents an input image from a narrower FOV image (which may also be referred to herein as an 'inner image or 'higher quality' image). As may be seen, image 102 and 104 capture different FOV images of the same scene, and they have both an overlapping portion and a non-overlapping portion, as will be discussed in further detail below. Image 106 represents an exemplary resultant fused wider FOV image, with enhanced texture, detail, and/or noise representation, as could be generated according to the various embodiments presented herein. (It is to be understood that the use of the term "fused" in "fused wider FOV image" herein refers to the fact that information from the narrower FOV image is being used or leveraged in some way to generate the resultant image 106. As will be explained herein, the use or leverage of image information from the narrower FOV image is not limited to traditional image fusion techniques, wherein pixels from one image are mathematically blended with corresponding pixel(s) from another image according to a blending weight, and may instead include other methods of using or leveraging information from the narrower FOV image, such as the injection of latent codes extracted from the narrower FOV image into the wider FOV image via a neural network.)

Due to the differences in optics, sensor, ISP tuning, or other factors, there may be an observable quality gap between the 'inner' image 104 and the 'outer' image 102. As described above, the inner image pixels come from a narrower FOV image capture device, which may have a longer focal length, and hence better perceived quality due to better spatial resolution. By contrast, the outer image pixels come from a wider FOV camera, which may exhibit stronger noise, lower spatial resolution, as well as a lack of sharpness and textures in certain portions of its FOV. This problem can also be generalized to camera configurations with more than two camera modules, e.g., having at least partially overlapping FOVs.

Direct image fusion between these two types of image sources (e.g., image 102 and image 104 in FIG. 1) could lead to a combined output with dramatically inconsistent image quality between inner and outer regions. Thus, embodiments disclosed herein will aim to enhance the visual quality of the wider FOV image, e.g., by enhancing it with (and/or directly blending it with) the image content from the narrower FOV camera, to produce a high resolution and high quality image without seams and blending artifacts, e.g., as shown in fused wider FOV image 106.

Inset images 114a and 114b present a zoomed-in view of region 112 from image 106 to provide a detailed comparison between a fused image result with texture enhancements provided by the current disclosure (i.e., image 114a) and a fused image result without the texture enhancements provided by the current disclosure (i.e., image 114b). In particular, dashed line 108 in image 106 represents the FOV of the narrow FOV image 104. As such, the areas of image 106 outside the extent of dashed line 108 represent the portions of the enhanced wider FOV image 106 that are not captured in the narrower FOV input image 104.

As may now be appreciated, region 112 comes partially from the bottom region 110 of image 106 outside the bounds of dashed line 108 of image 106 and partially from within the bounds of dashed line 108 of image 106. More particularly, line 116 in the inset images 114a and 114b represents the location of dashed line 108 within region 112. Put another way, the areas of the image 106 above line 116 come from the narrower FOV image 102 and have a higher degree of textual/spatial detail in both in inset images 114a and 114b. However, the area 118 of inset image 114a below line 116 comes from the wider FOV image 102, and thus has a lower degree of textual/spatial detail than narrower FOV image 104, while the area 120 of inset image 114b below line 116 comes from the wider FOV image 102, but has been enhanced (according to the techniques described in this Specification), e.g., based on a latent code extracted from narrower FOV image 104, and thus has a higher degree of textual/spatial detail (i.e., compared to area 118) that approximates the higher degree of textual/spatial detail from narrower FOV image 104.

The improved multi-sensor image processing techniques presented herein have broad applications in imaging systems, including smart phone camera systems, especially for two (or more) input images having non-overlapping regions in their FOVs and/or with very different image camera properties/quality characteristics. Such systems are capable of generating an enhanced output image with consistent image quality across the entire extent of the wider FOV image, wherein the image quality of the final output may be the same as (or close to) the highest quality of all the input image sources. Such systems may be applied directly to improve image stitching with images captured with different image capture devices, different zooming between two camera modules, and many other multi-sensor imaging applications.

Exemplary Image Processing Pipeline

Figure 2:
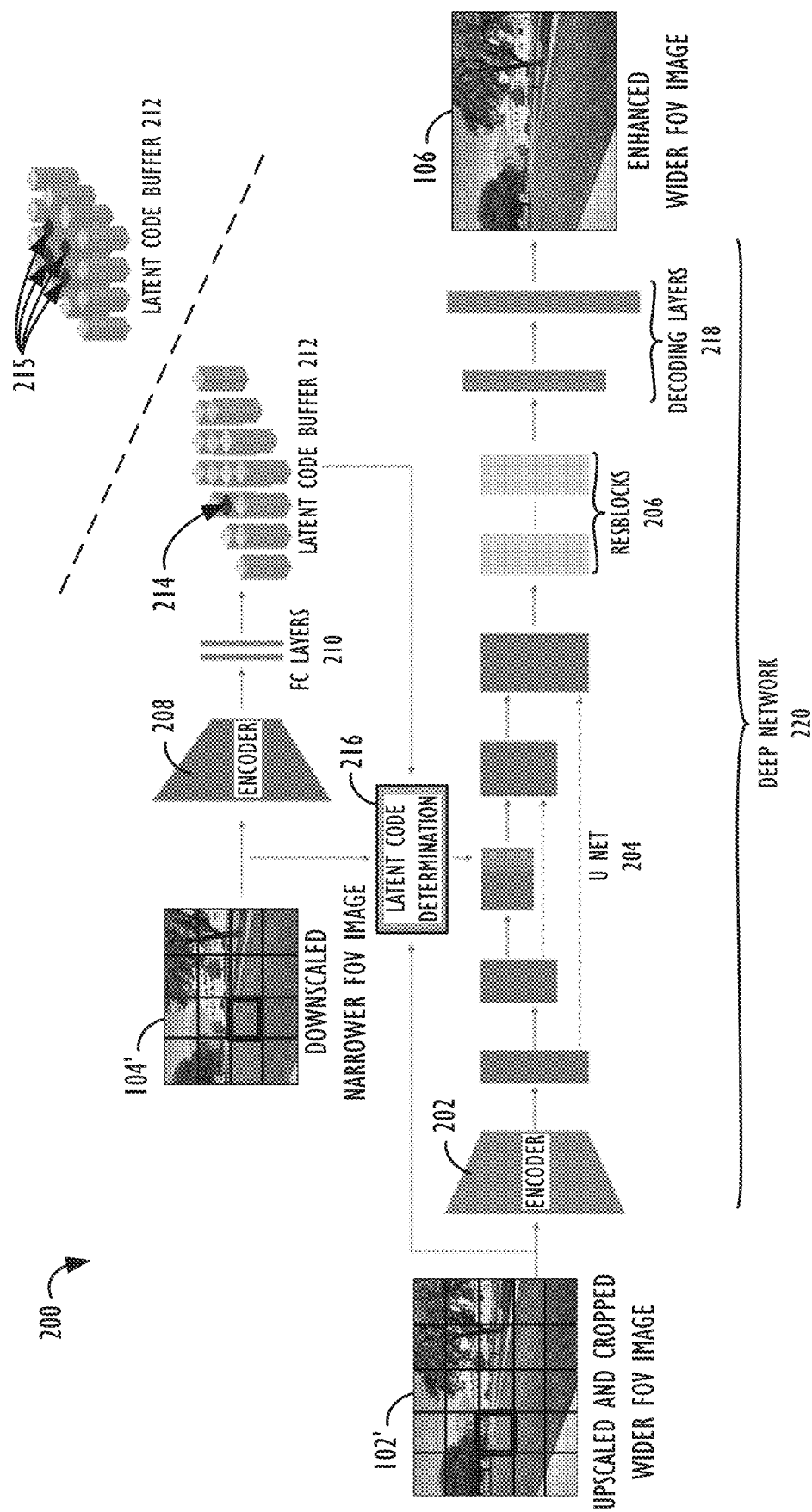
FIG. 2 illustrates an exemplary image enhancement processing pipeline, according to one or more embodiments.

Turning now to FIG. 2, an exemplary image enhancement processing pipeline 200 is illustrated, according to one or more embodiments. Pipeline 200 takes as input two images (102/104) with different spatial resolution, synchronously captured by two cameras with different optics (focal length, lens, design, etc.) and sensors, and processed by different ISP tunings. As discussed above, as a result, these two images may differ significantly in resolution, sharpness, texture details, noise patterns, and tone appearance, etc. According to some embodiments, for ease of processing, narrower FOV image 104 may be downscaled as image 104' before the latent code(s) are determined at block 216. Likewise, wider FOV image 102 may be upscaled and/or divided into a number of "tiles" as image 102' before being processed by the deep neural network 220. One reason the wider FOV image 102 may need to be upscaled is to maintain a fixed resolution output image. For example, if the wider FOV image 102 is at a zoom level of 1×, and the narrower FOV image 104 is at a zoom level of 2× then, then, in order to achieve an effective zoom level of 1.5× in the output image, the correct portion of the wider FOV image 102 may be cropped out and then upscaled to match the desired resolution level.

In a first part of pipeline 200, image 104' may also be divided into a number of crops or tiles. Each tile may then be used as input to encoder network 208 (which may serve as the encoder portion of an autoencoder network, such as a variational auto-encoder (VAE) network). Then, using a plurality a fully-connected (FC) layers 210, a latent code for each such tile may be precomputed and stored in a latent code buffer 212, which codes, as will be described below, may be used later in the pipeline 200. A latent code, as used herein, refers to a set of numerical representations of an image that encapsulate certain abstract properties of the image, such that, in latent space, the latent codes of images with similar inherent abstract properties with respect to the task at hand are close together in latent space, even if the images' similarity is based on non-observable attributes.

Turning back to the other input image to pipeline 200, wider FOV image 102' may also be divided into a number of crops or tiles. In some embodiments, the tiles may be any desired size, e.g., blocks of 128×128 pixels, 256×256 pixels, 512×512 pixels, etc. Each tile may then be used as input to encoder 202 of deep neural network 220. Deep network 220 may then use a U-Net 204 (or other form of convolutional network) to further process the input image 102' data, e.g., using multiple convolution and sub-sampling/down-sampling blocks, while passing information to later layers of the network using skip connections, if desired. As illustrated in FIG. 2, at the narrowest point in the network architecture (i.e., the 'bottleneck' layer), latent code determination block 216 may be used to inject a latent code determined based on the best-matching tile position from narrower FOV input image 104' into the deep network 220 (e.g., exemplary selected latent code 214 from latent code buffer 212 may represent the single precomputed latent code for the narrower FOV input image 104' tile that contains a central point of the best-matching tile position within narrower FOV input image 104' for the current tile of wider FOV image 102' that is being operated on). In some embodiments, the best-matching tile may be determined based on color content, frequency analysis (e.g., using a discrete cosine transformation), deep feature space matching, or other tile similarity metrics. In some embodiments, the best-matching tile position in narrower FOV input image 104' for a given tile of wider FOV image 102' may be identified using a nearest-neighbor search operation over the extent of narrower FOV input image 104'. The search step size may be n pixels in each dimension (e.g., n may equal as small as 1 pixel step sizes). In cases where no tile from the narrower FOV input image 104' is found to be sufficiently similar to a given tile from the wider FOV input image 102' (i.e., in order to be considered a close enough match), the pipeline 200 may instead simply determine a latent code at block 216 that is an average of all the latent codes stored in latent code buffer 212, an average of the latent codes from the n spatially-closest tiles from the narrower FOV input image 104', or some other default metric.

In other embodiments, the selected latent code 214 may actually comprise a selection of the n latent codes associated with the n tiles from narrower FOV input image 104' that are spatially the closest tiles to the identified best-matching tile position in narrower FOV input image 104' for the given tile of wider FOV image 102'. For example, as illustrated at 215 in FIG. 2, if the precomputed latent codes for narrower FOV input image 104' were computed for a regular grid of rectangular tiles over the extent of narrower FOV input image 104', then the number, n, may be set to 4 in a given implementation, i.e., the latent codes may be selected for the 4 spatially-nearest tiles to the identified best-matching tile position—one of which should actually include the identified best-matching tile position itself (as will be discussed further with regard to FIG. 3, element 312). Then, at latent code determination block 216, an interpolation (such as a bilinear interpolation, or other desired combination) of the n selected latent codes 215 from latent code buffer 212 may be performed to determine the final latent code that is injected into deep network 220 for the given tile of wider FOV image 102', such that the textural/noise/etc. representation of the portion or portions(s) of the narrower FOV input image 104' likely to contain the most similar content to the given tile of wider FOV image 102' may be used to enhance each respective tile of the wider FOV input image 102'.

In a preferred embodiment, at latent code determination block 216, the selected latent code 214 (or determined interpolated latent code, e.g., based on n selected latent codes 215) may simply be injected repeatedly at each pixel location (e.g., concatenated onto each pixel), thereby resulting in a 1×1×N layer, where N represents the number of elements in the latent code, e.g., 128, 256, 512, etc.

Other elements of deep network 220, such as residual blocks 206 (which may be used to allow for the flow of information from early layers of network 220 to the final layers of network 220) and decoding layers 218 may be used to up-sample/upscale features for each image tile from wider FOV input image 102' that has been enhanced with a latent code based on narrower FOV input image 104' (as described above), to ultimately produce enhanced wider FOV image 106.

As may now be appreciated, pipeline 200 illustrates a system design with a two-stage architecture that enables enhancement of both: image regions that are outside the FOV of the narrow FOV image but within the FOV of the wider FOV image; and overlapping FOV regions that are present in both input images. The system extracts latent codes from the guidance image (i.e., narrower FOV image) and is robust to parallax, depth of field, and image quality differences (such as saturation, tone mapping, etc.).

Latent Code Extraction Process

Figure 3:
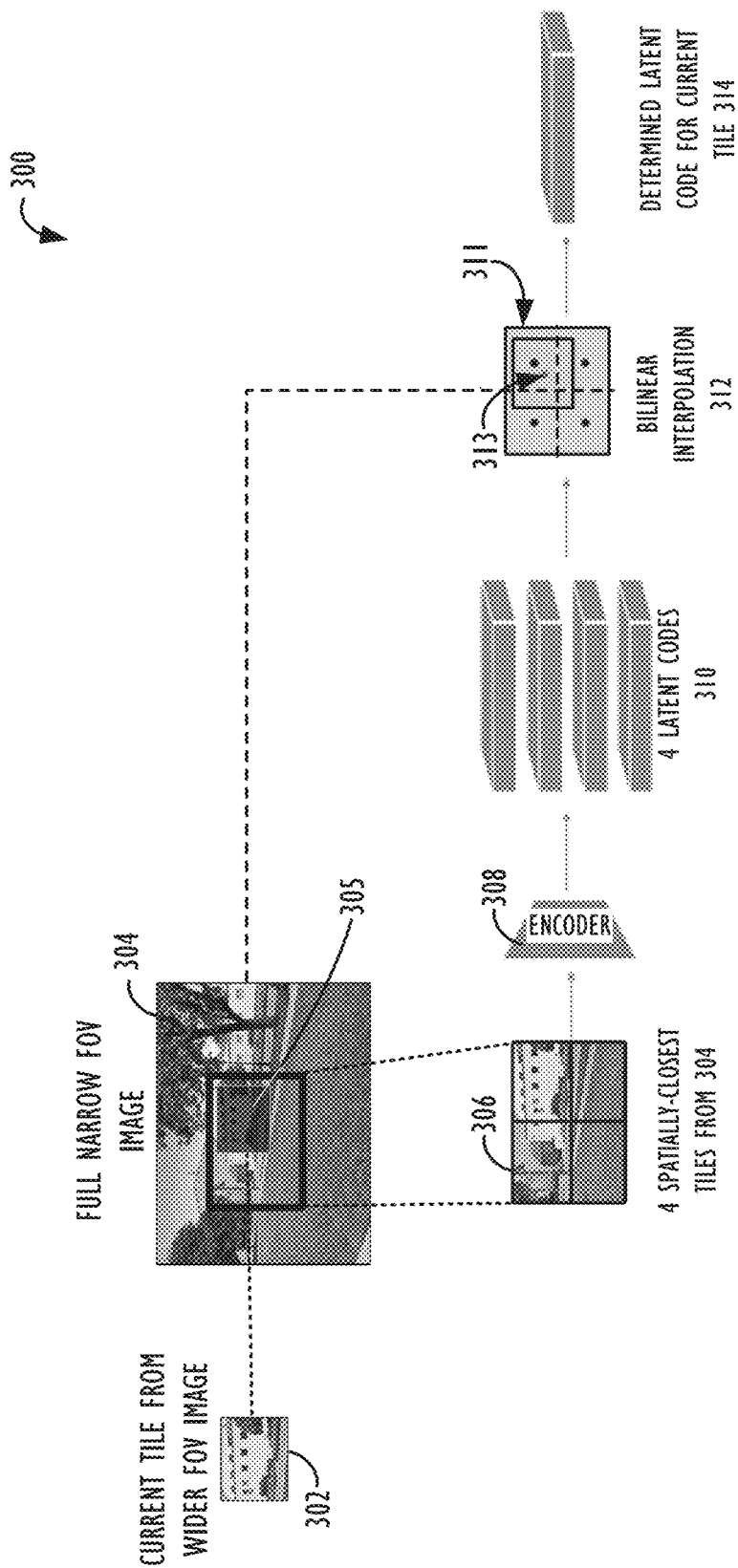
FIG. 3 illustrates an exemplary latent code extraction scheme, according to one or more embodiments.

Turning now to FIG. 3, an exemplary latent code extraction scheme 300 is illustrated in greater detail, according to one or more embodiments. Scheme 300 consists primarily of three stages: (1) precompute latent codes for the narrower FOV 'guide' image, e.g., over a regular grid of tiles; (2) perform tile matching between the narrower FOV image and wider FOV image, e.g., in feature space; and (3) perform interpolation to determine a final latent code to be used to enhance each tile of the wider FOV image.

As described above with reference to FIG. 2, in stage (1), the narrower FOV image (e.g., image 304) may be divided into a plurality of tiles, e.g., in a regular grid of tiles cropped from the original image (e.g., image 306 shows an exemplary set of four tiles from near the center of narrower FOV image 304), and the encoder 308 may be used to precompute latent codes 310 for all tiles of narrower FOV image 304 in a single pass (in this example, 4 exemplary tiles, i.e., the 4 tiles that are spatially closest to the determined best-matching tile position 305 for the current tile from the wider FOV image 302, are shown in greater detail in FIG. 3 for illustrative purposes). In stage (2), a tile from the wider FOV image 302 (i.e., a portion from the wider FOV image that is to be enhanced) may go through a tile-matching process, e.g., to find the best-matching tile position within the narrower FOV image, i.e., an set of image coordinates or offsets that places the current tile from the wider FOV image at a best-matching tile position in the narrower FOV image. In the example of FIG. 3, the best-matching tile position for current tile 302 is shown by outline at tile position 305.

As illustrated in FIG. 3, grid 311 illustrates of the central point (313) of the best-matching tile position in the narrower FOV image 304, as well as the four spatially-closest tiles (as also illustrated in image 306) from the narrower FOV image 304. In this example, the current tile from the wider FOV image 302 appears to align most closely with the upper-right tile in grid 311, while still sharing some overlap with each of the upper-left, lower-left, and lower-right tiles in grid 311. Thus, in some embodiments, an interpolation, e.g., bilinear interpolation 312, may be carried out between the latent codes 310 of the n spatially-closest tiles from the narrower FOV image, in order to determine the latent code 314 to be used for the enhancement of the current tile from the wider FOV image 302. As may now be understood, latent code 314 will have been determined to imbue the textural/noise/structural characteristics from the most relevant portions of the higher quality narrower FOV image to the corresponding tile from the lower quality wider FOV image. In this way, there may be consistency between how tiles and their respective latent codes are sampled at training time and at inference time. The design shown in FIG. 3 also allows for the rapid computation of latent codes—both offline and online.

In preferred embodiments, the matching (i.e., the matching to find the best-matching tile position in the narrower FOV image) may be carried out at a very low resolution (e.g., the original input image downsampled by a factor of 64, or more), and the feature space for matching may be DCT-based. It is to be understood that, in some cases, the most "relevant" tiles from the narrower FOV image (e.g., from a texture/noise/structure/etc. standpoint) may not all be adjacent to one another, and they also may not be the spatially-closest tiles to the determined best-matching tile position for the current tile from the wider FOV image (i.e., they may actually come from some tile in a different portion of the narrower FOV image). In other cases, as mentioned above, there may not be any tiles in the narrower FOV image that are similar enough to be considered a close match to the current tile form the wider FOV image. As discussed above, in such cases, many other alternative tile selection and latent code determination techniques (i.e., rather than choosing the n spatially-closest tiles to the determined best-matching tile position) may be employed to determine the final latent code to be used for the current tile from the wider FOV image, e.g.: (1) determining a final latent code that is an average of all latent codes computed for the narrower FOV image; (2) locating the n best-matching tile positions (rather than a single best-matching tile position) and then interpolating between the n latent codes for the corresponding n narrower FOV image tiles containing the located n best-matching tile positions to determine the final latent code (in some cases, the n best-matching tile positions may be required to be at least X pixels away from each other, so that latent codes are sampled from a larger extent of the image, and each latent code may be weighted in the interpolation, e.g., based on how far away in the image the given latent code's tile is from the best-matching tile position, etc.); (3) performing a direct comparison of latent codes (e.g., using an L2 norm or some other distance metric) to locate the n pre-computed latent codes from the latent code buffer for the narrower FOV image that are the most similar to the latent code for the tile from the narrower FOV image that included the best-matching tile position and then interpolating between the latent code for the tile from the narrower FOV image that included the best-matching tile position and the other n located latent codes to determine the final latent code for the current tile from the wider FOV image, etc.

Training Loss Functions

According to some embodiments, variational auto-encoder (VAE) frameworks may be used to extract the latent codes from the narrower FOV or 'guide' images. VAEs utilize a stochastic variational inference and learning algorithm to allow extraction of the most compact and representative compression of an input image, which is also referred to herein as a latent code. As discussed above with reference to FIG. 2, the general architecture of a VAE includes an encoder and a decoder, where the encoder extracts the latent code, and the decoder reconstructs the input image based on the latent code. The reconstruction quality, as well as the physical properties of the latent code, depend largely on the loss function(s) chosen when training the VAE. The choice of loss functions allows the flexibility of not only customizing a latent code extraction module for a given task, e.g., such as the texture enhancement tasks being performed by the embodiments disclosed herein, but also allow for the fine tuning of the output image by manually manipulating the latent code.

Utilizing the VAE framework for latent code extraction may require inclusion of a decoder network in training phase, which can be ignored during the inference phase. It may also be beneficial to introduce an additional loss term(s) in the overall loss function to ensure the trained VAE extracts efficient and meaningful latent codes.

Compared with the hour-glass network (e.g., a U-Net), which is a pair of directly-connected encoder and decoders, and is trained without any regularization on the distribution of the latent code, a VAE ensures the space of the latent code to be stochastic, where the resulting code has a Gaussian probability density and thus can be interpolated smoothly. However, a standard VAE architecture has been demonstrated to suffer from problems, such as so-called 'entanglement' among components in the latent code, as well as ignored codes when the encoder has increased capacity. These problems may lead to practical difficulties. For one example, the lack of semantic meaning for the latent codes prevents a user or developer from manually manipulating the output image's appearance in predictable and/or desirable ways. For another example, when processing highly-complex natural images, texture inconsistency could happen across different image tiles that make up the extent of the image that is attempting to be enhanced.

To solve these problems, different modifications of the loss function have been proposed, such as beta-VAE or Maximum Mean Discrepancy VAE (i.e., MMD-VAE). Combining these advanced loss functions with different methods of targeted injecting latent code from representative overlapped image regions allows the network to render uniform and high fidelity textured output. Furthermore, by adopting semi-supervised training stratagem, a subset of interpretable variables may be separated from the latent code. Connecting them with image tuning "knobs" allows a user or designer of a system to independently and individually control the output image's characteristics, such as texture density, color balance, noise pattern, etc.

Figure 4:
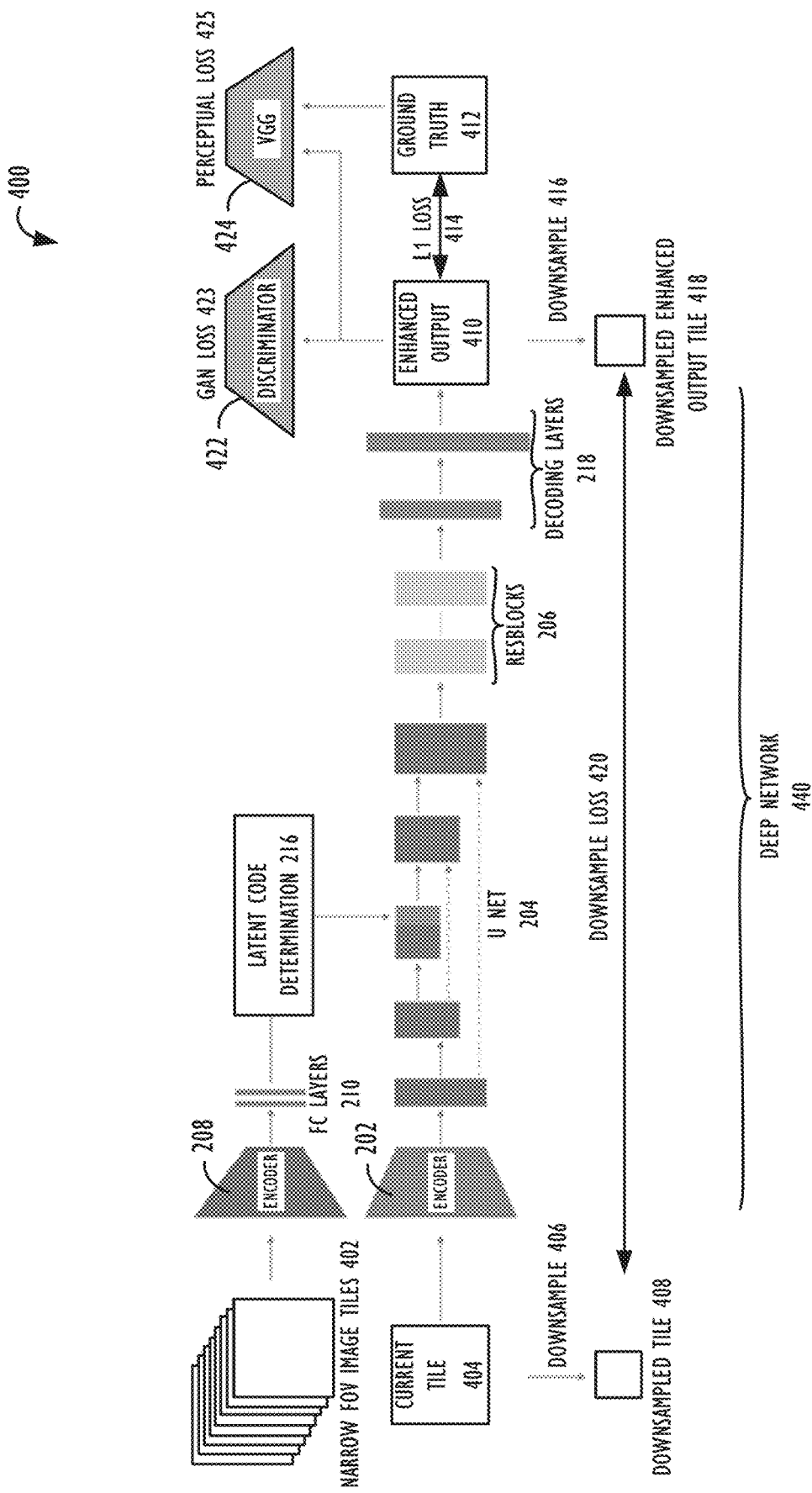
FIG. 4 illustrates exemplary loss functions that may be used during training of a deep network, according to one or more embodiments.

Turning now to FIG. 4, exemplary loss functions that may be used during training 400 of a deep network 440 are illustrated, according to one or more embodiments. As illustrated, the deep network 440 used during the exemplary training operation illustrated in FIG. 4 is based on the architecture of the deep network 220 illustrated in FIG. 2, with several modifications, which will now be discussed in further detail.

First, deep network 440 uses tiles 402 extracted from the narrower FOV image to generate a latent code for each tile, which may later be selected and/or combined at latent code determination block 216 for use on tiles from the wider FOV image being enhanced, as described above with reference to FIGS. 2 and 3. The current tile 404 from the wider FOV image may then be processed by the deep network 440 to develop an enhanced output image 410, also as described above with reference to FIGS. 2 and 3. According to some embodiments, one or more loss function may be utilized during the network training operation, so as to ensure that the network is generating a quality and consistent enhanced output image.

For example, an L1 (or other norm) loss may be calculated at 414, e.g., by doing a difference calculation between the enhanced output image 410 and the ground truth image 412, wherein the ground truth image 412 comprises a portion of an image of the same scene represented in enhanced output image 410 that was captured by an actual higher quality, e.g., narrower FOV, image capture device. The L1 loss term may be used to quantify the amount of texture detail difference between the enhanced output image 410 and the ground truth image 412.

As another example, a downsampling loss 420 may also be calculated, e.g., as between a downsampled enhanced output tile 418 (i.e., created by application of a downsampling process 416 to the enhanced output image 410) and a downsampled version of the current tile 408 (i.e., created by application of a downsampling process 406 to the current image tile 404). The downsampling loss 420 may be used to correct colors and tune consistent looks between the input and output image tiles.

As another example, discriminator loss 423 may also be calculated, e.g., using a discriminator 422, e.g., a Generative Adversarial Network (GAN), that attempts to discern whether the enhanced output image 410 looks similar (e.g., in terms of texture/noise/structure/etc.) to a "real" (i.e., non-synthesized) higher quality, e.g., narrower FOV, image. The discriminator loss 423 may be used to ensure that the network is generating output at a level good enough to pass as image data actually captured by a "real" higher quality, e.g., narrower FOV, image capture device.

As another example, perceptual loss 425 may also be calculated, e.g., using a convolutional neural network, e.g., a VGG network 424, that is configured to discern high-level and structural similarities between the enhanced output image 410 and the ground truth image 412. The perceptual loss 425 may be used to ensure that the network is generating output with high-level structural similarities to "real" higher quality, e.g., narrower FOV, images.

As may be appreciated, any one or more of these loss functions may be used or combined in various ways during a given training operation, based on the needs of a given implementation. The loss functions described herein are merely exemplary of the types of loss functions that may be used to attempt to train the deep network 440 in an effective and efficient fashion. The training operation may conclude when the loss function (or combination of loss functions) reaches a satisfactory minimum value and/or when it appears that further iterations of training will not produce noticeably better output image results.

Exemplary Image Processing Operations

Figure 5A:
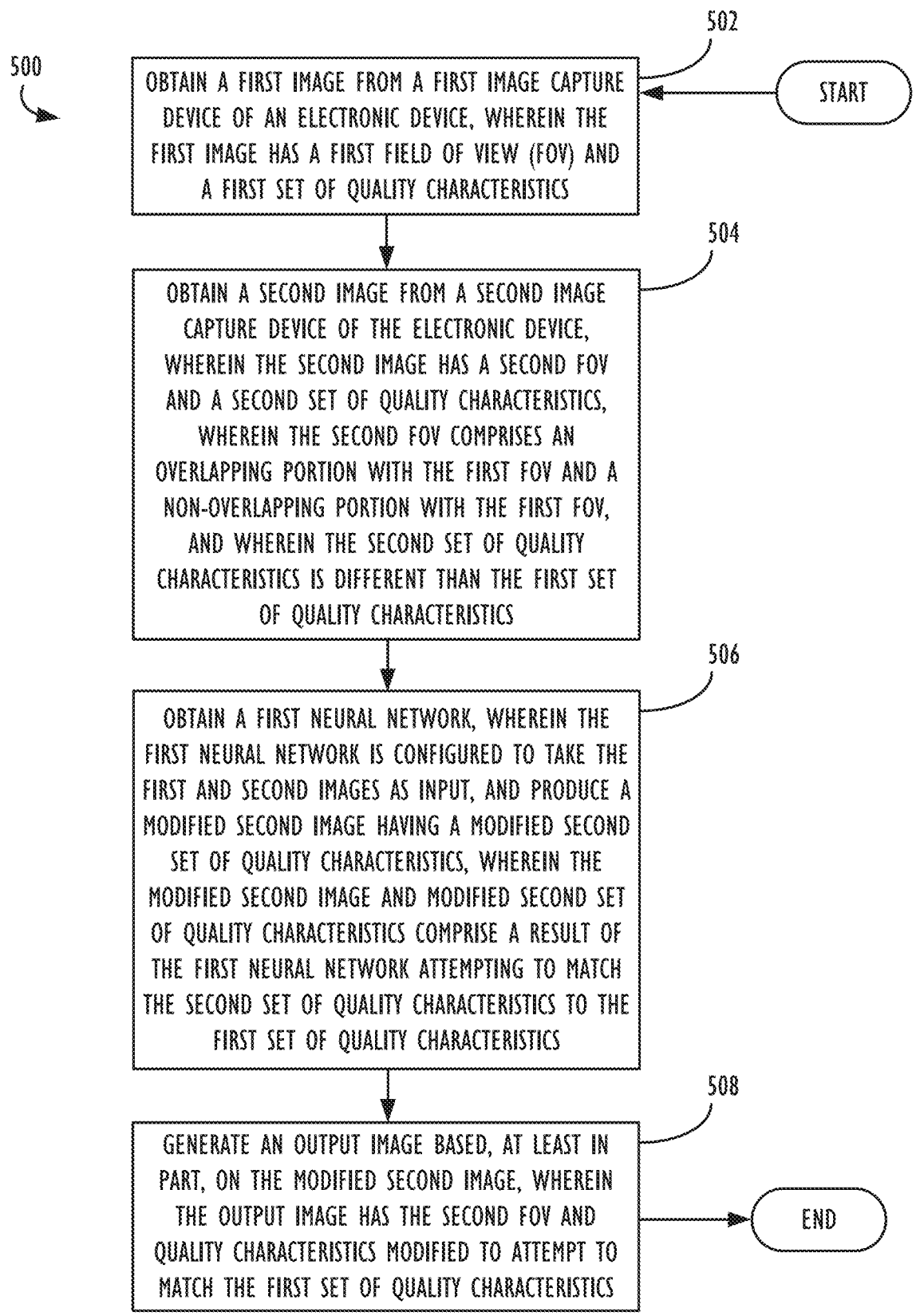
FIG. 5A is flow chart illustrating a method of performing neural network-enhanced image processing techniques, according to one or more embodiments.

Referring now to FIG. 5A, a flow chart illustrating a method 500 of performing neural network-enhanced image processing techniques is shown, in accordance with one or more embodiments. First, at Step 502, the method 500 may obtain a first image from a first image capture device of an electronic device, wherein the first image has a first FOV and a first set of quality characteristics. In some instances, the types of quality characteristics in the first set of quality characteristics may comprise at least one of: a texture level, a noise level, a detail level, a saturation level, a sharpness level, or a spatial resolution level. In such instances, the first set of quality characteristics may comprise values (e.g., actual numerical values and/or latent codes representative of such characteristic values, etc.) for each such type of quality characteristic of the first image. Next, at Step 504, the method 500 may obtain a second image from a second image capture device of the electronic device, wherein the second image has a second FOV and a second set of quality characteristics, wherein the second FOV comprises an overlapping portion with the first FOV and a non-overlapping portion with the first FOV, and wherein the second set of quality characteristics is different than the first set of quality characteristics. In some instances, the types of quality characteristics in the second set of quality characteristics may also comprise at least one of: a texture level, a noise level, a detail level, a saturation level, a sharpness level, or a spatial resolution level. In such instances, the types of quality characteristics represented in the first set of quality characteristics and the types of quality characteristics represented in the second set of quality characteristics may be the same, while the values for one or more of the quality characteristics in the first set of quality characteristics may be different than the values for the corresponding type of quality characteristic in the second set of quality characteristics. For example, if the first image had a noise level characteristic value of 44.0 (on a scale of 0-100), the second image may have a noise level characteristic of value of 76.0 (on the same scale of 0-100).

Next, at Step 506, the method 500 may obtain a first neural network, wherein the first neural network is configured to take the first and second images as input, and produce a modified second image having a modified second set of quality characteristics, wherein the modified second image and modified second set of quality characteristics comprise a result of the first neural network attempting to match the second set of quality characteristics to the first set of quality characteristics. Finally, at Step 508, the method 500 may generate an output image based, at least in part, on the modified second image, wherein the output image has the second FOV and quality characteristics modified to attempt to match the first set of quality characteristics. In some instances, the value of certain types of quality characteristics in the output image may match the value of the corresponding type of quality characteristic in the first image (e.g., both the output image and the first image achieving a noise level characteristic value of 44.0, in the case of hypothetical example given above), while, in other instances, the value of certain types of quality characteristics in the output image may simply be modified so as to provide a closer match to the value of the corresponding type of quality characteristic in the first image (e.g., the first image having a noise level characteristic value of 44.0 and the output image achieving a noise level characteristic value of 48.0). In some instances, the first neural network may attempt to determine an optimal output, i.e., matching the values of as many of the quality characteristics of the output image as possible as closely as possible to the values of the corresponding quality characteristics of the first image. In some embodiments, the modified second image may simply be used as the output image (subject to any desired post-processing or tuning). In other embodiments, the output image may instead be generated by blending or fusing portions of the modified second image with portions of the original first image (i.e., prior to any desired post-processing or tuning).

Figure 5B:
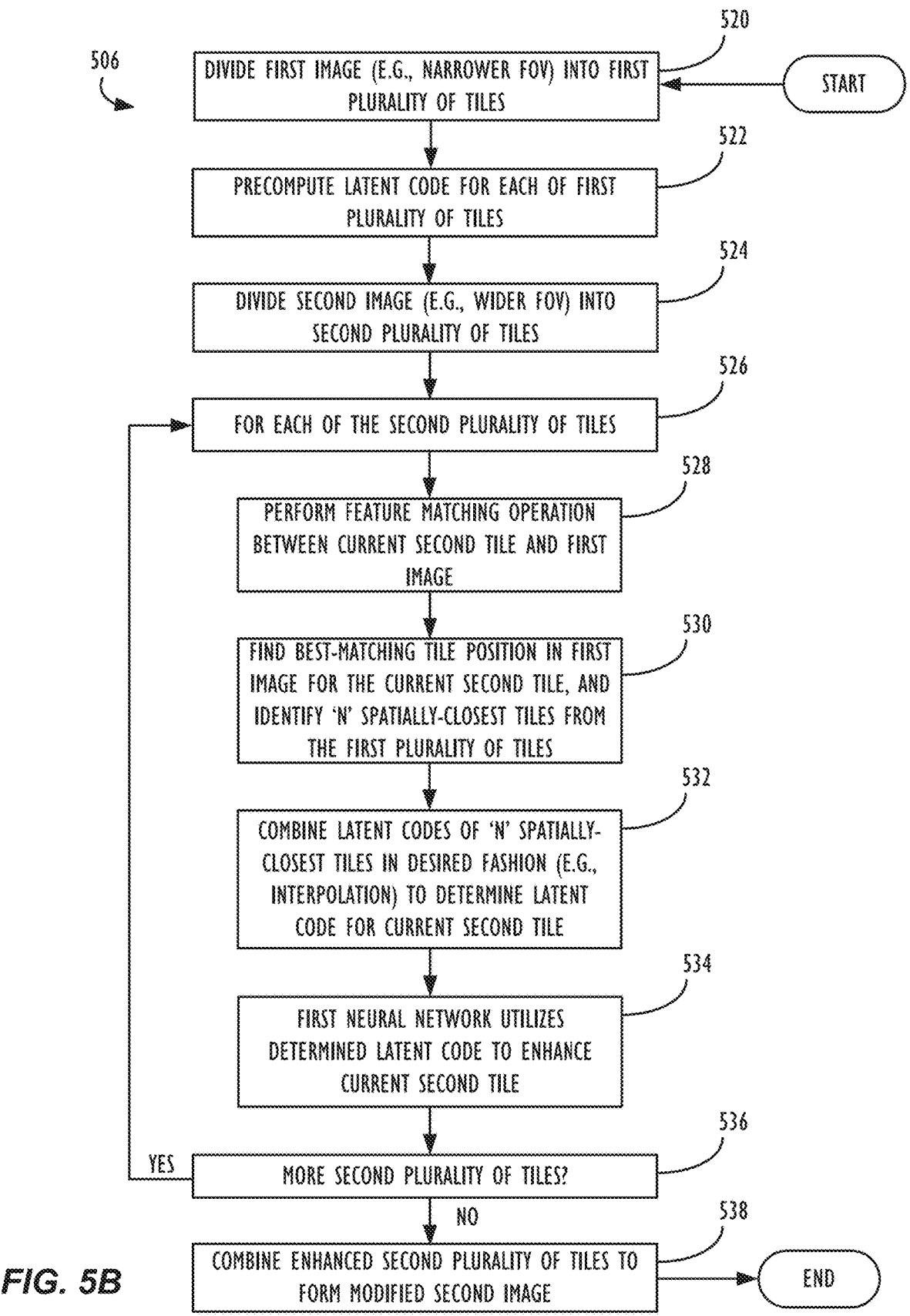
FIG. 5B is flow chart illustrating a method of latent code extraction techniques, according to one or more embodiments.

Referring now to FIG. 5B, a flow chart illustrating a more detailed method of performing Step 506 of FIG. 5A using latent code extraction, in accordance with one or more embodiments. First, at Step 520, the method 506 may divide the first image (e.g., narrower FOV image or 'guide' image) into a first plurality of tiles. Next, at Step 522, the method 506 may precompute a latent code for each of first plurality of tiles. Next, at Step 524, the method 506 may divide the second image (e.g., wider FOV image) into a second plurality of tiles.

Then, for each of the second plurality of tiles (Step 526), the method 506 may: perform a feature matching operation (or other desired matching operation) between the current second tile and first image (e.g., using a nearest-neighbor search operation over the extent of the first image) (Step 528); find a best-matching tile position in first image for the current second tile, and identify the n spatially-closest tiles from the first plurality of tiles (Step 530); combine the latent codes of the n spatially-closest tiles in a desired fashion (e.g., interpolation) to determine the latent code for current second tile (Step 532); and then use the first neural network and the determined latent code to enhance the current second tile (Step 534). As mentioned above, this matching process may be performed on significantly downsampled versions of the original image content, in order to improve performance. If there are no further tiles in the second plurality of tiles to process (i.e., "NO" at Step 536), the method 500 may proceed to combine the enhanced second plurality of tiles to form a modified second image (Step 538). If, instead, there are further tiles in the second plurality of tiles to process (i.e., "YES" at Step 536), the method 500 may return to Step 536 and continue processing the remaining tiles in the second plurality of tiles.

The techniques of method 500 may provide the following illustrative benefits for multi-sensor image fusion/enhancement: (1) the ability to enhance and hallucinate appropriate image texture details to bridge the image quality gap between images captured by differing image capture devices; (2) a dramatic reduction in image noise and increase in signal-to-noise ratio (SNR); (3) a reduction in chromatic aberration; and (4) automatic improvements in local tone-mapping (LTM) and detail preservation in shadow regions of the enhanced output images.

Exemplary Electronic Computing Devices

Figure 6:
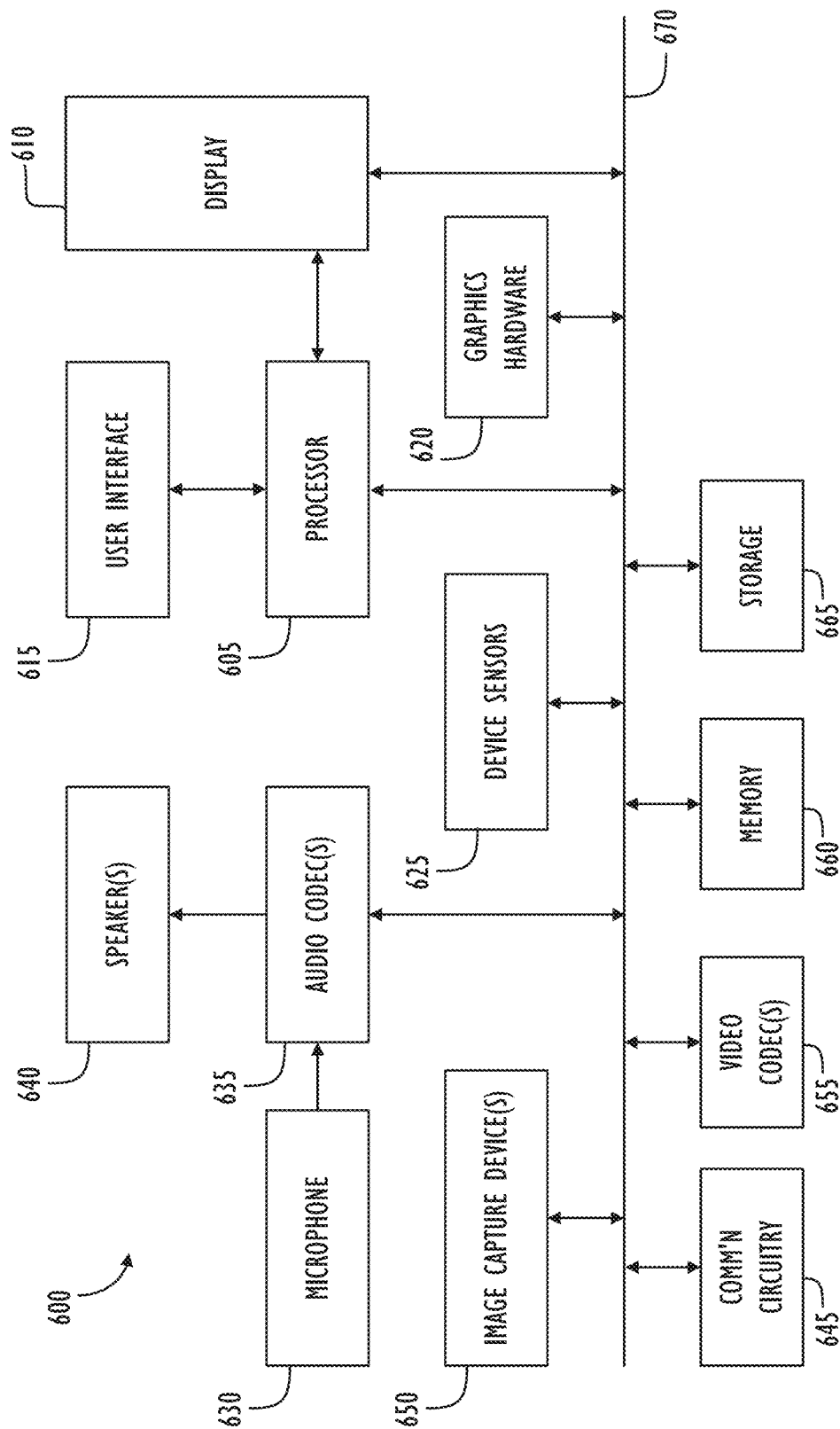
FIG. 6 is a block diagram illustrating a programmable electronic computing device, in which one or more of the techniques disclosed herein may be implemented.

Referring now to FIG. 6, a simplified functional block diagram of illustrative programmable electronic computing device 600 is shown according to one embodiment. Electronic device 600 could be, for example, a mobile telephone, personal media device, portable camera, or a tablet, notebook or desktop computer system. As shown, electronic device 600 may include processor 605, display 610, user interface 615, graphics hardware 620, device sensors 625 (e.g., proximity sensor/ambient light sensor, accelerometer, inertial measurement unit, and/or gyroscope), microphone 630, audio codec(s) 635, speaker(s) 640, communications circuitry 645, image capture device 650, which may, e.g., comprise multiple camera units/optical image sensors having different characteristics or abilities (e.g., Still Image Stabilization (SIS), high dynamic range (HDR), optical image stabilization (OIS) systems, optical zoom, digital zoom, etc.), video codec(s) 655, memory 660, storage 665, and communications bus 670.

Processor 605 may execute instructions necessary to carry out or control the operation of many functions performed by electronic device 600 (e.g., such as the generation and/or processing of images in accordance with the various embodiments described herein). Processor 605 may, for instance, drive display 610 and receive user input from user interface 615. User interface 615 can take a variety of forms, such as a button, keypad, dial, a click wheel, keyboard, display screen and/or a touch screen. User interface 615 could, for example, be the conduit through which a user may view a captured video stream and/or indicate particular image frame(s) that the user would like to capture (e.g., by clicking on a physical or virtual button at the moment the desired image frame is being displayed on the device's display screen). In one embodiment, display 610 may display a video stream as it is captured while processor 605 and/or graphics hardware 620 and/or image capture circuitry contemporaneously generate and store the video stream in memory 660 and/or storage 665. Processor 605 may be a system-on-chip (SOC) such as those found in mobile devices and include one or more dedicated graphics processing units (GPUs). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 perform computational tasks. In one embodiment, graphics hardware 620 may include one or more programmable graphics processing units (GPUs) and/or one or more specialized SOCs, e.g., an SOC specially designed to implement neural network and machine learning operations (e.g., convolutions) in a more energy-efficient manner than either the main device central processing unit (CPU) or a typical GPU, such as Apple's Neural Engine processing cores.

Image capture device 650 may comprise one or more camera units configured to capture images, e.g., images which may be processed to generate enhanced versions of said captured images, e.g., in accordance with this disclosure. Output from image capture device 650 may be processed, at least in part, by video codec(s) 655 and/or processor 605 and/or graphics hardware 620, and/or a dedicated image processing unit or image signal processor incorporated within image capture device 650. Images so captured may be stored in memory 660 and/or storage 665. Memory 660 may include one or more different types of media used by processor 605, graphics hardware 620, and image capture device 650 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 660 and storage 665 may be used to retain computer program instructions or code organized into one or more modules and written in any desired computer programming language. When executed by, for example, processor 605, such computer program code may implement one or more of the methods or processes described herein.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A non-transitory computer readable medium comprising computer readable instructions executable by one or more processors to:
   obtain a first image from a first image capture device of an electronic device, wherein the first image has a first field of view (FOV) and a first set of quality characteristics;
   obtain a second image from a second image capture device of the electronic device, wherein the second image has a second FOV and a second set of quality characteristics, wherein the second FOV comprises an overlapping portion with the first FOV and a non-overlapping portion with the first FOV, and wherein the second set of quality characteristics is different than the first set of quality characteristics;
   obtain a first neural network, wherein the first neural network is configured to take the first and second images as input, and produce a modified second image having a modified second set of quality characteristics, wherein the modified second image and modified second set of quality characteristics comprise a result of the first neural network attempting to match the second set of quality characteristics to the first set of quality characteristics of the first image; and
   generate an output image based, at least in part, on the modified second image, wherein the output image has the second FOV and quality characteristics modified to attempt to match the first set of quality characteristics.

2. The non-transitory computer readable medium of claim 1, wherein the first image capture device has a first set of properties, wherein the second image capture device has a second set of properties, and wherein the second set of properties is different than the first set of properties.

3. The non-transitory computer readable medium of claim 2, wherein at least one property of the first and second sets of properties comprises: field of view, spatial frequency, depth of field, magnification, zoom, spectral response range, or resolution.

4. The non-transitory computer readable medium of claim 1, wherein the first neural network is further configured to extract at least one latent code from the first image.

5. The non-transitory computer readable medium of claim 4, wherein the first neural network is further configured to separate a first plurality of interpretable variables from at least one of the at least one latent codes from the first image, wherein the first plurality of interpretable variables may be modified to independently change semantically-distinguishable characteristics of the modified second image.

6. The non-transitory computer readable medium of claim 5, wherein at least one of the semantically-distinguishable characteristics comprises: texture density, color balance, noise pattern, or noise level.

7. The non-transitory computer readable medium of claim 1, wherein the modified second image comprises modifications to improve the quality characteristics of both the overlapping portion and the non-overlapping portion of the second FOV.

8. The non-transitory computer readable medium of claim 1, wherein at least one quality characteristic of the first and second sets of quality characteristics comprises: texture level, noise level, detail level, or saturation level.

9. The non-transitory computer readable medium of claim 1, wherein the first neural network is further configured to divide the first image into a first plurality of tiles.

10. The non-transitory computer readable medium of claim 9, wherein the first neural network is further configured to extract a latent code for each of the first plurality of tiles.

11. The non-transitory computer readable medium of claim 10, wherein the first neural network is further configured to divide the second image into a second plurality of tiles.

12. The non-transitory computer readable medium of claim 11, wherein the first neural network is further configured to determine a latent code for each of the second plurality of tiles by interpolating between the latent codes extracted for two or more tiles of the first plurality of tiles.

13. The non-transitory computer readable medium of claim 12, wherein the first neural network is further configured to utilize the latent codes determined for each of the second plurality of tiles to produce the modified second image having the modified second set of quality characteristics.

14. A device, comprising:
a memory;
one or more image capture devices;
a user interface; and
one or more processors operatively coupled to the memory, wherein the one or more processors are configured to execute instructions causing the one or more processors to:
obtain a first image from a first image capture device of the one or more image capture devices, wherein the first image has a first field of view (FOV) and a first set of quality characteristics;
obtain a second image from a second image capture device of the one or more image capture devices, wherein the second image has a second FOV and a second set of quality characteristics, wherein the second FOV comprises an overlapping portion with the first FOV and a non-overlapping portion with the first FOV, and wherein the second set of quality characteristics is different than the first set of quality characteristics;
obtain a first neural network, wherein the first neural network is configured to take the first and second images as input, and produce a modified second image having a modified second set of quality characteristics, wherein the modified second image and modified second set of quality characteristics comprise a result of the first neural network attempting to match the second set of quality characteristics to the first set of quality characteristics of the first image; and
generate an output image based, at least in part, on the modified second image, wherein the output image has the second FOV and quality characteristics modified to attempt to match the first set of quality characteristics.

15. The device of claim 14, wherein the first neural network is further configured to extract at least one latent code from the first image.

16. The device of claim 15, wherein the first neural network is further configured to separate a first plurality of interpretable variables from at least one of the at least one latent codes from the first image, wherein the first plurality of interpretable variables may be modified to independently change semantically-distinguishable characteristics of the modified second image.

17. The device of claim 16, wherein the instructions to generate an output image further comprise instructions to generate an output image further based, at least in part, on fusion of at least a portion of the first image with at least a portion of the modified second image.

18. An image processing method, comprising:
obtaining a first image from a first image capture device of an electronic device, wherein the first image has a first field of view (FOV) and a first set of quality characteristics;
obtaining a second image from a second image capture device of the electronic device, wherein the second image has a second FOV and a second set of quality characteristics, wherein the second FOV comprises an overlapping portion with the first FOV and a non-overlapping portion with the first FOV, and wherein the second set of quality characteristics is different than the first set of quality characteristics;
obtaining a first neural network, wherein the first neural network is configured to take the first and second images as input, and produce a modified second image having a modified second set of quality characteristics, wherein the modified second image and modified second set of quality characteristics comprise a result of the first neural network attempting to match the second set of quality characteristics to the first set of quality characteristics of the first image; and
generating an output image based, at least in part, on the modified second image, wherein the output image has the second FOV and quality characteristics modified to attempt to match the first set of quality characteristics.

19. The method of claim 18, wherein the first neural network is further configured to extract a latent code for each of a first plurality of tiles of the first image.

20. The method of claim 19, wherein the first neural network is further configured to determine a latent code for each of a second plurality of tiles of the second image by interpolating between the latent codes extracted for two or more tiles of the first plurality of tiles, and wherein the first neural network is further configured to utilize the latent codes determined for each of the second plurality of tiles to produce the modified second image having the modified second set of quality characteristics.

* * * * *